Feb. 18, 1958 W. C. SCHOFIELD 2,823,912
SINTER COOLER
Filed Dec. 29, 1954 3 Sheets-Sheet 1
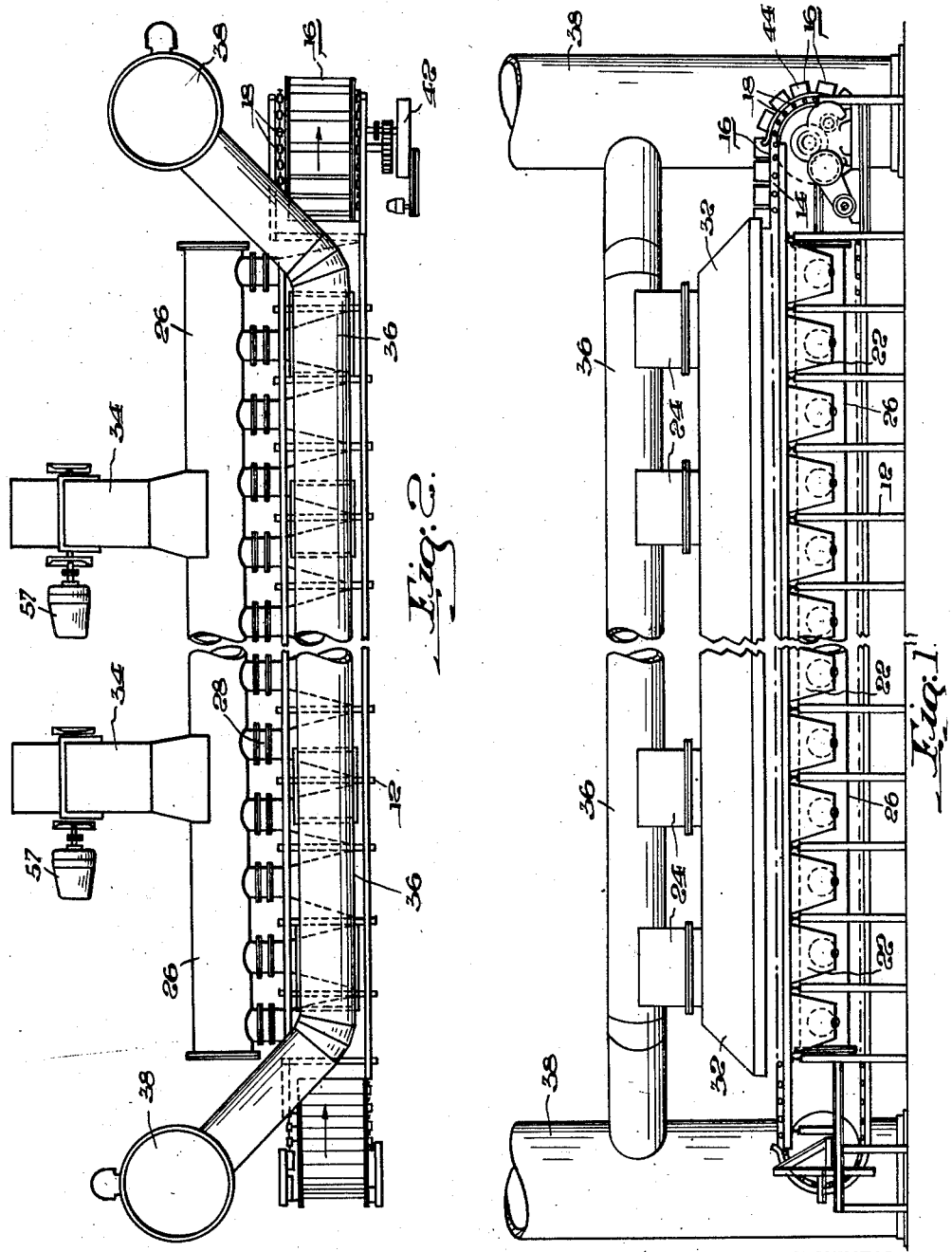
INVENTOR.
WILFRED C. SCHOFIELD.
BY
his
ATTORNEY

INVENTOR.
WILFRED C. SCHOFIELD.

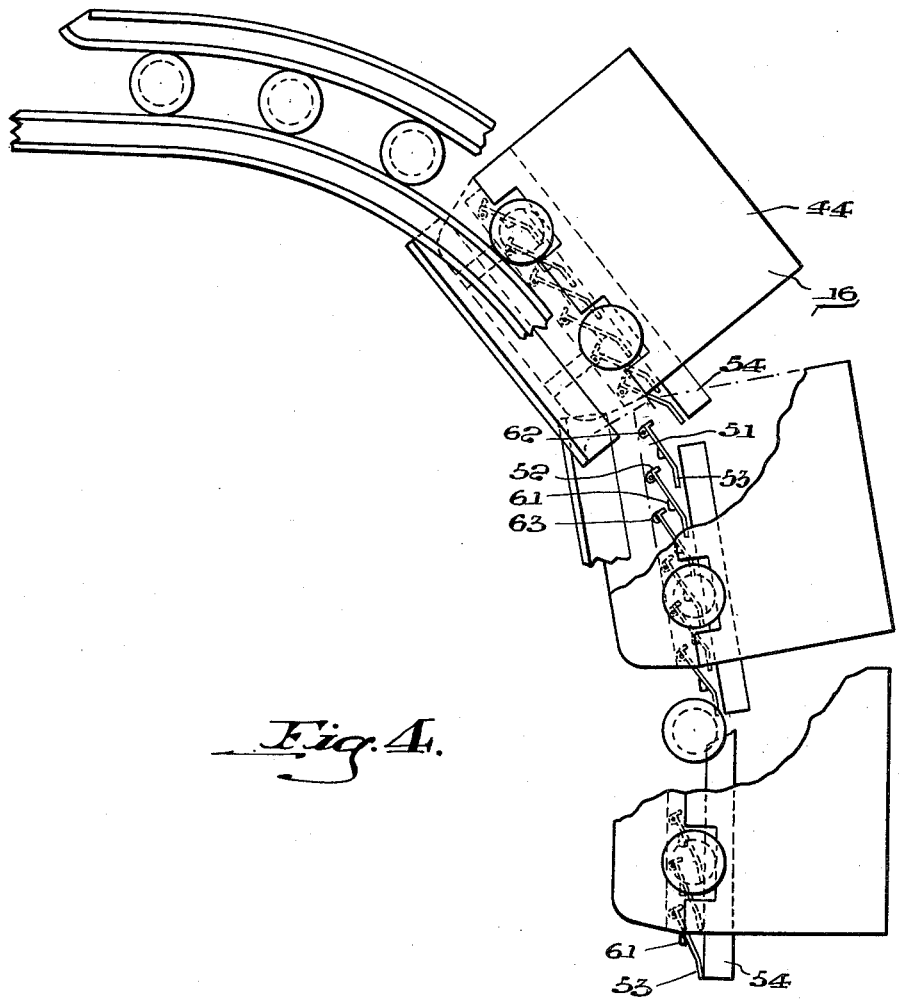

United States Patent Office 2,823,912
Patented Feb. 18, 1958

2,823,912

SINTER COOLER

Wilfred C. Schofield, Pittsburgh, Pa., assignor to Koppers Company, Inc., a corporation of Delaware Application December 29, 1954, Serial No. 478,354

2 Claims. (Cl. 266—21)

This invention relates to an apparatus for cooling particles of heated material and more particularly relates to an apparatus for cooling sintered ores.

In the prior art, various devices have been used to cool sintered material to a sufficiently low temperature for transit on rubber conveyor belts. For example, a rotary air cooler has been employed for this purpose; however, this arrangement required the addition of water to effectively cool the sinter and has proven to be complex in its construction and maintenance. More recently, other attempts have been made to cool the sintered ore, including devices which incorporate part of the sintering machine itself. In these devices, however, the sintered materials agglomerate to such a degree on the sintering part of the machine that cooling of the agglomerated material cannot be properly effected in the immediate sequence of steps. Moreover, the construction of the machine itself presents difficulties since the structure required for the high temperatures used in sintering is necessarily different from the structure required for the lower temperatures used in cooling. Further, the driving of pallets on a sintering machine, the grate supporting members for the sintered material, and the arrangement of the endless track in combination with the wind box are different when applied to a cooling problem as when applied to a heating problem.

The present invention avoids the aforementioned disadvantages, providing an apparatus for cooling sintered material which is efficient in its operation and maintenance and straight-forward in its construction.

By providing a separate and distinct apparatus for the cooling of the sintered material, the present invention now has made it possible to use a much lighter structure than previously used in sintering apparatus and to arrange the material supporting means whereby a maximum throughput of air can be obtained in order to permit optimum cooling of the heated materials. The present invention further permits a closer regulation of cooling temperatures as a result of its unique structural arrangement.

Another feature of the present invention is to provide specially shaped louvers adapted to retain sinter material and to allow a maximum free area for air passage.

Still another feature of the present invention is to provide an apparatus which serves both as a means for cooling the sintered material and as a conveying means for transporting the cooled sintered material from one position to another.

Still another feature of the present invention is to provide easily replaceable louver means to support the material to be cooled.

A particular feature of this invention is to provide a pivotal louver bar which, as it changes position at the discharge end of the sinter cooler, moves in such a manner as to aid in the discharge of said sinter from the pallet.

Still another feature of the present invention is to provide a simple yet efficient means for linking said pallets together for driving purposes.

Various other features of the present invention will become evident from the disclosure herein.

More particularly, the present invention provides an apparatus for cooling sinter comprising an endless track; a series of connected pallets mounted for movement about said track; grate means adapted to support sintered material on said pallets and permit cooling air to blow therethrough comprising a plurality of louvers, each of said louvers having a flat portion disposed substantially parallel to the line of movement of the sinter bed, a downwardly projecting intermediate portion disposed at approximately the angle of repose of said sinter material and having at its lower edge a lip extending upwardly toward said sinter bed and terminating at a point at which a line drawn upwardly from such point at an angle, with respect to the horizontal, equal to the angle of repose of said sinter material does not intersect the flat portion of a next louver, said louver being pivotally mounted at a point adjacent the lower extremity of said intermediate portion; and a series of wind boxes positioned relative said pallets and opening thereto, said wind boxes being adapted to flow cooling air through the sintered material supported on said grate means.

In the drawings accompanying and forming a part of this specification,

Figure 1 is a diagrammatic, side elevational view, illustrating one form of apparatus embodying the present invention;

Figure 2 is a plan view of the apparatus disclosed in Figure 1;

Figure 4 is an enlarged schematic view disclosing the details of the louvers and their arrangement with relationship to the endless track at the discharge end of the track.

Figure 3:
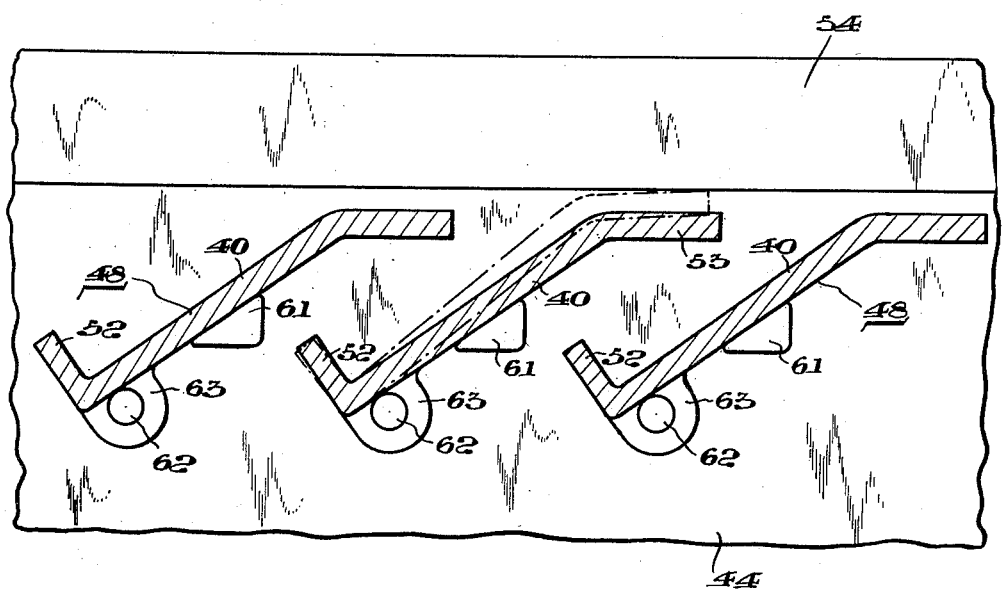
Figure 3 is an enlarged view of a portion of a pallet grate showing the shape of the louver bar, a preferred mounting position and the support means for said bar.

Referring to Figure 1 of the drawings, an endless track supporting structure 12 is disclosed having an endless track 14 supported thereby, the endless track including upper and lower horizontally disposed flights. Pallets 16 having the front and rear wheel pairs 18 affixed thereto are adapted to ride on the endless track 14. Positioned beneath the pallets and opening thereto are a succession of wind boxes 22, the wind boxes being adapted to push cooling air upwardly through the sintered material supported on the louvers as hereinafter described. This cooling arrangement is accomplished through means of the fan assembly 34 (Fig. 2) which, for example, can be a 120,000 cubic foot per minute fan operating at 10 inches of water. These fan assemblies 34 are connected to an air main 26 which in turn is connected through the wind box inlets 28 and ultimately to the wind boxes 22.

Superposed above the cooling structure is a hood 32, which can extend the entire length of the structure; however, in some instances it would only be necessary to have this hood extend a partial length of the structure, the hood being only necessary in the early stages of the cooling. The hood is connected to an exhaust main 36 through the hood offtakes 24, the exhaust main in turn leading to the exhaust stacks 38 as disclosed in Figures 1 and 2 of the drawing.

In order to drive the pallets along the endless track a driving arrangement 42 as is known in the sintering art is provided. This driving arrangement engages in a rack-pinion fashion with the links connecting the pallets 16. Each of the pallets 16 is provided with the side plates 44 extending above the endless track so as to overlap with a portion of the hood as is known in the prior art. These side plates are connected to the pallets by means of a bolt and nut arrangement.

As illustrated in Fig. 3, the louvers 48, are supported by the abutments 61 and the pins 62 which fit in the bushings 63. The pins 62 and abutments 61 are supported by the side plate 44 as is the keeper bar 54. It is to be noted that the keeper bar 54 is positioned above the horizontal plane in which the flat portions 53 of the louvers 48 lie when loaded. This allows movement of the louvers as illustrated by the dotted lines on the middle louver bar of Figure 3. This freedom of movement is a feature of this invention as it contributes to freeing the sinter and clearing the pallet on discharge. The louvers 48 when in position on the pallets 16 stretch transversely across the pallets and serve as a means to support the material to be cooled.

In order to prevent the material from dropping through the spaced grates the louvers have the lips 52 at their lower edges. When the louvers are moved in a horizontal direction along the upper flight of the track these lips extend from the lower extremity of the intermediate portion 40 upwardly toward the sinter bed and terminate at a point at which a line drawn upwardly from such point substantially parallel to such intermediate portion and at an angle, with respect to the horizontal, equal to the angle of repose of said sinter material does not intersect the flat portion of the next louver. In this connection, it is to be noted that the intermediate portion 40 of each louver is such that the line drawn substantially parallel thereto makes an angle with the horizontal of approximately 35° to approximately 42° when the louvers are moved in a horizontal direction along the upper flight of the track. This angle range of approximately 35° to approximately 42° is the angle of repose for various ore materials, as is well known in the art and as is set forth in the 1927 edition of "Mining Engineers' Handbook," by Robert Peele, page 1156, volume 1.

As seen in Figure 4 the flat portion 53 of the louvers acts as a guide means for the cool sintered material when it reaches the end or discharge portion of the endless track. It is to be further noted that as the pallets 16 reach the discharge position (as illustrated in Figure 4) the louvers consecutively pivot on the pins 62 providing relative motion with respect to adjacent louver bars. As aforementioned this is a feature of this invention. It provides in a manner heretofore unknown a freeing action on the cooled sintered material which facilitates its discharge and minimizes retention of cooled sinter on the pallet.

The louvers 48 can of course, be supported by obvious mechanical equivalents of the pin and bushing arrangement disclosed in Fig. 3. For example, the pins 62 can be attached to or integral with the louver 48 and said pins can fit into holes in the side plates 44. The embodiment disclosed in Fig. 3 provides for the easy removal of individual louver bars, which can be accomplished by removing the keeper bar 54 and the pins 62. It will be noted that, the particular shape of the louver bars described herein provides a large area for air coming from the wind boxes 22 to the sinter bed. That is, an area running the entire lateral distance of the pallets 16 and from the tip of the lip of one louver to the bottom of the intermediate portion of the next louver is available for the passage of air through the sinter bed. The particular construction of the louver bars used herein provides this large area which allows more efficient cooling of the sinter bed and lower power consumption for pumping the cooling medium. With reference to the shape of the louvers it will be realized that the upwardly extending lip portion, while illustrated at an angle of 90° with reference to the intermediate portion need not necessarily be at this angle although this is a convenient angle for fabrication. So long as this lip extends upwardly to the sinter bed from the louver edge of the intermediate portion of the louver to a point from which a line drawn upwardly at an angle with relation to the horizontal equal to the angle of repose of said sintered material is not intersecting with relation to the flat portion of the next following louver, the desirable large area for air passage is obtained and the sinter bed is supported without passage of the sinter particles through the grate. It is to be noted that this amount of upward extension of the tip 52 gives the maximum support to the sinter and at the same time allows a maximum area of air passage upwardly past the louver and through the sinter bed. If the tip 52 is extended upwardly to a point from which a line drawn at the angle of repose with respect to the horizontal intersects the flat portion of the next louver it will be noted that the area for air passage is diminished which is undesirable. Thus, the preferred upward extension of the tip 52 is to such a point that a line, drawn upwardly therefrom with respect to the horizontal, equal to the angle of repose of said sinter, abuts but does not intersect the flat portion of the next louver.

In operation the sinter to be cooled is fed onto the pallets 16 at the left hand portion of the sinter cooler as illustrated in Figure 1. The pallets then pass from the left to right under the hood 32. The sides 44 of the pallets 16 engage with hood 32 in known manner to minimize escape of air therefrom. The motors 57 power the fan assemblies 34 and provide air through the main 26, the inlets 28 and the wind boxes 22. The air then passes upwardly through the louvers 48 of the grate through the sinter bed and are exhausted through the hood 32, the hood offtakes 24, the exhaust main 36 and the stacks 38. As the pallets 16 reach the right hand end of the cooler they are discharged as they tilt and pivot on the pins 62 and are then returned via the lower portion of the endless track 14 to the feed position at the left hand position of the machine as shown at Figure 1. It is when this tilting occurs at the discharge points that the heretofore relative movement between the louvers occurs which gives a freeing action which aids in discharge of the sinter material and provides clean pallets for loading.

Materials or mechanisms conventionally used in sinter cooling machines can be utilized in the construction of the various parts of the novel combination disclosed and claimed herein.

It is to be understood that various modifications can be made by one skilled in the art in the arrangement, form and construction of this invention without departing from the scope or spirit thereof.

What is claimed is:

1. An apparatus for cooling sintered ore material comprising an endless track including upper and lower horizontally disposed flights; a series of connected pallets mounted for movement about said track; grate means adapted to support said sintered material on said pallets and permit cooling air to blow therethrough comprising a plurality of louvers, each of said louvers having, as it moves in a horizontal direction along said upper flight of said track, a flat portion disposed in a horizontal position substantially parallel to the line of movement of the sintered bed, a downwardly projecting intermediate portion disposed at an angle with the horizontal of approximately 35° to approximately 42° which is approximately the angle of repose of said sinter material said intermediate portion of each of said louver bars having at its lower edge a lip extending upwardly toward said sinter bed and terminating at a point at which a line drawn upwardly from such point substantially parallel to said intermediate portion and at an angle, with respect to the horizontal, equal to the angle of repose of said sinter material does not intersect the flat portion of a next louver, said louver being pivotally mounted at a point adjacent the lower extremity of said intermediate portion; and a series of wind boxes positioned relative said pallets and opening thereto, said wind boxes being adapted to flow cooling air upwardly through the sintered material supported on said grate means.

2. An apparatus for cooling sintered ore material comprising an endless track including upper and lower horizontally disposed flights; a series of connected pallets mounted for movement about said track; grate means adapted to support said sintered material on said pallets and permit cooling air to blow therethrough comprising a plurality of louvers, each of said louvers having, as it moves in a horizontal direction along said upper flight of said track, a flat portion disposed in a horizontal position substantially parallel to the line of movement of the sinter bed, a downwardly projecting intermediate portion disposed at an angle with the horizontal of approximately 35° to approximately 42° which is approximately the angle of repose of said sinter material, said intermediate portion of each of said louver bars having at its lower edge a lip extending upwardly toward said sinter bed and terminating at a point at which a line drawn upwardly from such point substantially parallel to said intermediate portion and at an angle, with respect to the horizontal, equal to the angle of repose of said sinter material, abuts the leading edge of the flat portion of a next louver, said louver being pivotally mounted at a point adjacent the lower extremity of said intermediate portion; and a series of wind boxes positioned beneath said pallets and opening thereto, said wind boxes being adapted to flow cooling air upwardly through the sintered material supported on said grate means.

References Cited in the file of this patent

UNITED STATES PATENTS

| | | |
|---|---|---|
| 1,388,334 | Greenwalt | Aug. 23, 1921 |
| 1,574,276 | Bennis | Feb. 23, 1926 |
| 1,802,960 | Simmonds | Apr. 28, 1931 |
| 2,092,080 | Le Maire | Sept. 7, 1937 |

FOREIGN PATENTS

| | | |
|---|---|---|
| 166,160 | Great Britain | July 11, 1921 |
| 211,499 | Great Britain | Nov. 24, 1924 |
| 484,685 | Germany | Oct. 18, 1929 |